Patented Mar. 16, 1926.

1,576,663

UNITED STATES PATENT OFFICE.

GUY LEONARD, OF BALTIMORE, MARYLAND.

STENCIL SHEET.

No Drawing. Application filed July 11, 1925. Serial No. 43,027.

*To all whom it may concern:*

Be it known that I, GUY LEONARD, a subject of the King of Great Britain, residing in Baltimore, in the county of Baltimore and State of Maryland, have invented certain new and useful Improvements in Stencil Sheets, of which the following is a specification.

This invention relates to stencil-sheets for typewriting and stylographic work.

The principal object of the invention is to produce at low cost an efficient, strong, durable and economical stencil-sheet, which does not crack and will withstand crumpling and rough handling, and which is plastic and pliable and can be stenciled without dampening, but which will yield far more copies than an ordinary wax stencil-sheet, and which will cause the ink to be deposited sparingly on the stencil-copies, thus improving the product and economizing ink and also avoiding the necessity of blotting the stencil-copies or of using anti-offset devices, and which will preserve its good qualities both before and after empressing the stencil-characters thereon.

The raw sheet or base of the stencil-sheet is loose-fibred paper, such as Yoshino, which is coated by using a liquid that includes a large proportion, say twenty parts by weight, of a 25 per cent shellac solution in methyl alcohol, although the strength of this solution may be varied. The shellac should be a good quality orange shellac. However, shellac solutions of different qualities and grades may be employed; and the proportion of shellac solution used in the herein-disclosed formula may be varied to suit. The strength of the shellac solution itself may also be varied. It will be understood that for dissolving the shellac, any suitable alcohol, acetone or amylacetate may be used. This solution is temporary, inasmuch as the alcohol eventually dries out of the coating upon the stencil-sheet.

With the shellac solution is used a proportion of about eight parts by weight of a glycerol fatty acid ester, which may be triacetin, by the aid of which it is designed to secure great and permanent pliability and elasticity in the stencil-sheet. The triacetin is a plastifier, or renders the coating more plastic, or gives it a gummy quality. The shellac and triacetin form a mixture or mechanical compound. Since alcohol evaporates from the coated sheet, the weight of the shellac in the dried coating may finally be somewhat less than the weight of the triacetin. Triacetin and shellac being mutually soluble in alcohol, or in ether, or acetone, or any of the common solvents for shellac, the result is therefore a homogeneous coating, upon evaportion of the solvents at the sheet-drying operation.

An added softening or tempering ingredient is diethylphthalate, of which five parts by weight may be used. The diethylphthalate is also soluble in alcohol or the other common solvents, thus making with the shellac and triacetin a homogeneous dry coating upon the evaporation of the alcohol or solvent.

While the specified proportions of the various ingredients give excellent results, still the proportions may be varied within the scope of the invention. There is also permissible some latitude of variation in the ingredients themselves, as, for example, glycerin may be used as a substitute softening agent, or a suitable oil, or a suitable grease. Or the softening agent diethylphthalate may be modified by glycerin, or by a suitable oil or grease. If desired, a good substitute softening agent can be made of palm oil and stearic acid (or oleic acid) in the proportions of about 3 parts palm oil and about 2 parts stearic acid. When oil or stearic acid or oleic acid is employed in softening, sufficient heat should be applied to secure a proper solution.

The coating preparation can be colored with any dye that is soluble in alcohol, or in a common solvent of the solution.

The coating solution may be prepared at ordinary room temperature, preferably by first mixing the liquid triacetin and diethylphthalate, and then adding the shellac solution, in any suitable vessel, and then if desired adding a dye. This bath may be kept at room temperature, and in it the Yoshino paper-sheets may be immersed; or the sheets may be just floated upon this coating bath or liquid. The excess of the coating liquid may be removed from the sheet by drawing it over a straight edge or wire or other suitable device, and the sheet may be hung up to dry. There is sufficient evaporation of the alcohol in from twenty to thirty minutes, to permit handling of the sheet. When dry, the sheet is ready for use in the typewriting machine. For transportation, storage and handling, sheets of oil paper may be packed between the stencil-sheets, whose tackiness, if present, is hardly appreciable. The oil sheet is preferably removed before inserting the stencil-sheet in the typewriter. Tackiness may be reduced or eliminated by diminishing the proportion of shellac. The shellac, as well as being impervious to stenciling ink, binds or holds the other ingredients together. Other binding agents than shellac may be used, and conduce to toughness, durability and ink-resisting qualities of the stencil-sheet. The triacetin prevents the shellac from becoming brittle. The diethylphthalate softens or tempers the coating.

The typewriter-types make cleaner and narrower cuts in the stencil than usual heretofore, indicating the quality of elasticity imparted by the triacetin. The stencil-sheet is highly economical of ink during the operation of producing stencil-copies therefrom. There is no need to blot the stencil-copies or to interleave sheets therewith, or to use other anti-offset devices. The stencil-copies can be handled at once, without danger of smearing the ink thereon. The stencil-sheet preserves its original form notwithstanding wrinkling, crumpling and rough handling; it is elastic, and does not permanently stretch, nor do the fibres of the Yoshino tissue base loosen or pull apart. It is excellent for stylographic work as well as typewriting.

In making copies from the typed or otherwise impressed stencil, very much less ink than heretofore reaches the stencil-copy, and hence the inked characters do not spread thereon and become unsightly, nor is blotting necessary, but the copies can be handled right away, or piled up, without smearing or offsetting. There is a decided saving of ink.

The invention is not limited to the proportions given; and within the scope of the invention various substitutes or equivalents may be used for the binding gum, the ester and the softener, as will be understood by those skilled in chemistry.

I claim:

1. A stencil-sheet of loose-fibered paper coated with a solution of shellac, triacetin and diethylphthalate.

2. A stencil-sheet having a base of loose-fibered paper provided with a dried homogeneous coating having by weight about five parts of shellac, eight parts of triacetin, and five parts of diethylphthalate.

3. A paper-coating bath including twenty parts by weight of twenty-five per cent shellac solution in methyl alcohol, eight parts by weight of triacetin, and five parts by weight of diethylphthalate.

4. A loose-fibered paper provided with a homogeneous coating of a glycerol fatty acid ester, diethylphthalate, and a binding agent.

5. The process of dissolving shellac in alcohol, mixing in the solution glycerol fatty acid ester, and adding to the solution diethylphthalate.

6. The process of dissolving shellac in alcohol, mixing in the solution glycerol fatty acid ester, and adding to the solution diethylphthalate and a dye.

7. An ink-proof coating bath for paper, having twenty parts by weight of a twenty-five per cent solution of orange shellac in methyl alcohol, about eight parts by weight of triacetin, and about five parts by weight of diethylphthalate.

GUY LEONARD.